Feb. 12, 1963  C. BECK ET AL  3,077,575
ALLOWABLE LOAD LIMIT COMPUTER AND INDICATOR
Filed July 2, 1959  3 Sheets-Sheet 1

INVENTORS
CYRUS BECK
LOUIS S. GUARINO
BY

AGENT

Feb. 12, 1963     C. BECK ET AL     3,077,575
ALLOWABLE LOAD LIMIT COMPUTER AND INDICATOR
Filed July 2, 1959     3 Sheets-Sheet 3
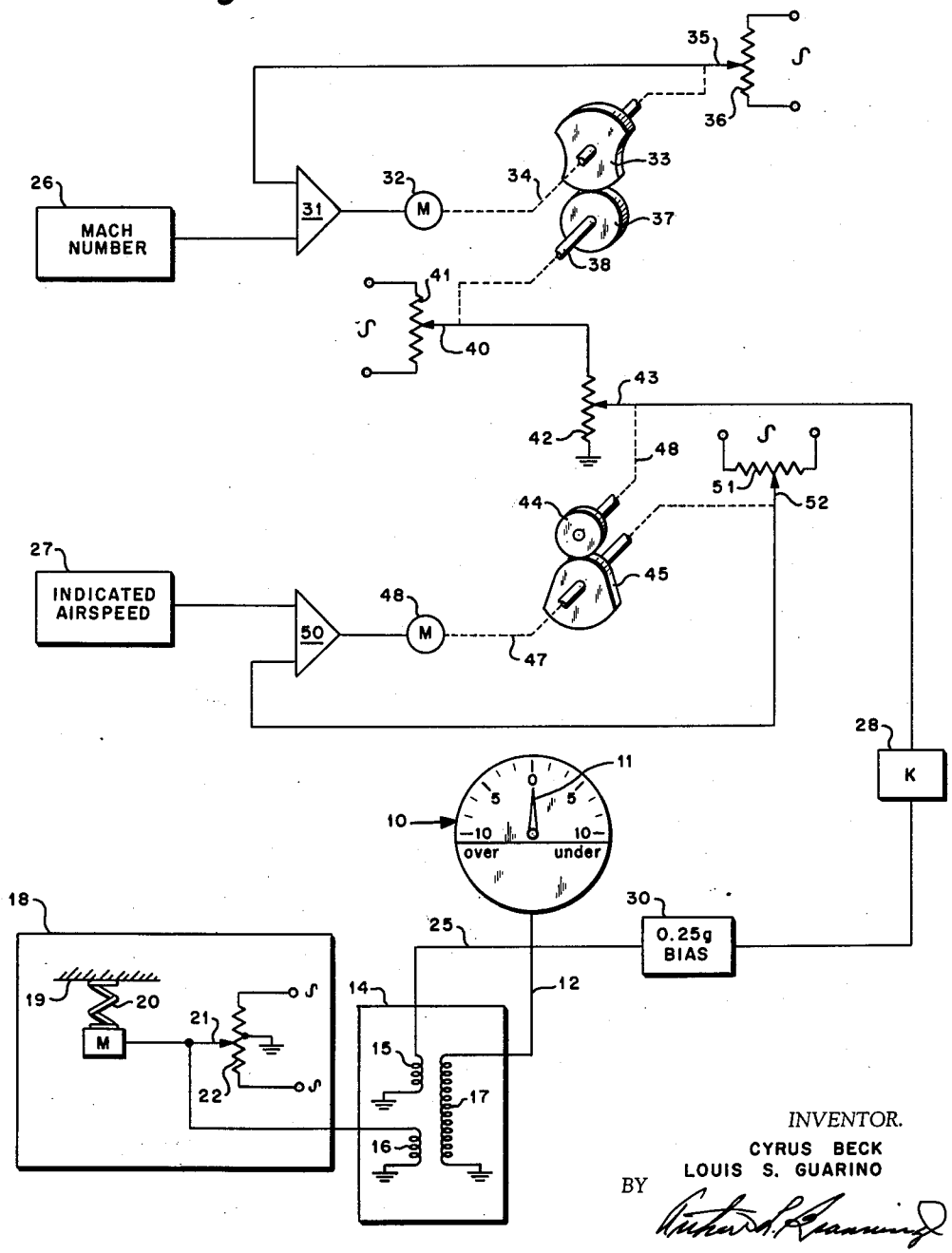
INVENTOR.
CYRUS BECK
LOUIS S. GUARINO
BY
AGENT

United States Patent Office 3,077,575
Patented Feb. 12, 1963

3,077,575
ALLOWABLE LOAD LIMIT COMPUTER
AND INDICATOR
Cyrus Beck, Abington, and Louis S. Guarino, Hatboro, Pa., assignors to the United States of America as represented by the Secretary of the Navy
Filed July 2, 1959, Ser. No. 824,750
8 Claims. (Cl. 340—27)
(Granted under Title 35, U.S. Code (1952), sec. 266)

The invention described herein may be manufactured and used by or for the Government of the United States of America for governmental purposes without the payment of any royalties thereon or therefor.

This invention relates to an allowable load limit indicator and a computer therefor particularly suited for use in a manned aircraft.

One of the principal objects of the present invention is the provision of a novel allowable load limit computer for making available a signal proportional to the maximum allowable load limit for which a particular aircraft is built at an indicated airspeed and Mach number.

Another object of the invention is the provision of an allowable load limit computer for making available a discriminable signal proportional to the difference, if any, between the maximum allowable load for which a particular aircraft is built, as set forth in the preceding object, and the actual load being instantaneously imposed on the aircraft. The discriminable signal is highly useful since it can be used in an instrument for indicating if a critical load limit is being exceeded, in an automatic pilot for preventing the critical load limit from being exceeded, or in the manual control system of an aircraft for preventing the control system from being operated in such a manner that the particular control surface would be overstressed or cause an overstressing of another part of an aircraft.

A further object of the invention is the provision of a load limit computer having a preselected safety factor incorporated into the computer in such a manner that the output signal is proportioned to include the safety factor.

A still further object of the invention, as set forth in the preceding objects, is the provision of a novel load limit computer which is fully automatic in operation.

Another object of the invention is the provision of an aircraft instrument for indicating when the instantaneous normal acceleration load on an aircraft is approaching and exceeding the computed maximum allowable load limit.

A further object of the invention is the provision of an aircraft instrument, as set forth in the preceding object, calibrated for indicating the number of $g$'s remaining before the maximum allowable load limit is exceeded and/or by how many $g$'s the load limit is being exceeded.

Another object of the invention is the provision of a novel aircraft instrument for accurately indicating whether or not the maximum allowable load limit of an aircraft is being exceeded.

The invention further resides in certain novel features of construction, combinations and arrangements of parts, and further objects and advantages of the invention will be apparent to those skilled in the art to which it pertains from the following description of the present preferred embodiment thereof described with reference to the accompanying drawings, which form a part of this specification, and wherein the same reference characters represent corresponding parts throughout the several views, and in which:

FIG. 3 is a schematic diagram of an electromechanical arrangement embodying a preferred form of the invention.

Figure 1:
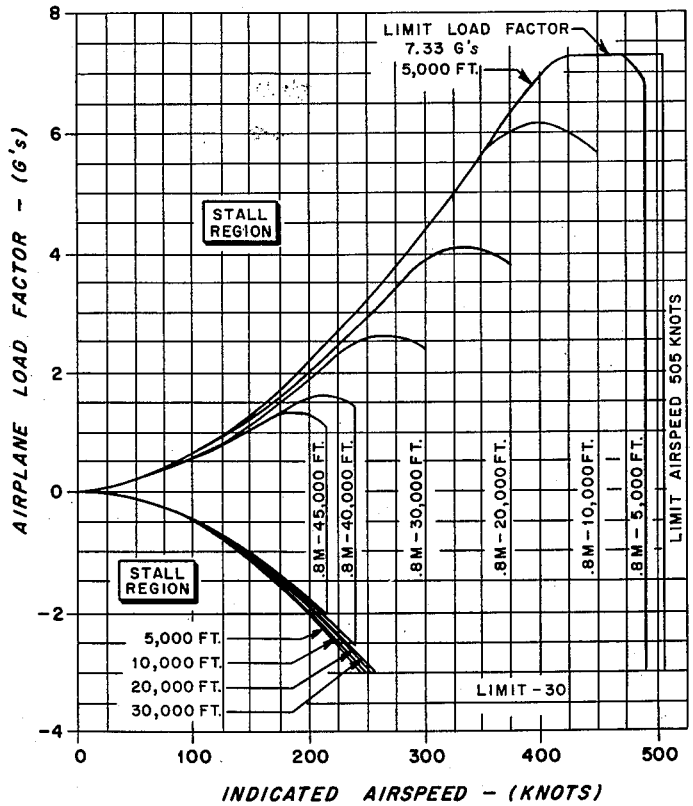
FIG. 1 is a flight strength V-$n$ diagram of an arbitrarily selected aircraft and wherein indicated air speed is plotted versus the aircraft load factor.

It is to be understood that the invention is not limited to the details of construction and arrangement of parts shown in the drawings and hereinafter described in detail, but is capable of being otherwise embodied and of being practiced or carried out in various ways. It is to be further understood that the phraseology or terminology employed herein is for the purpose of description and there is no intention to herein limit the invention beyond the requirements of the prior art.

Referring to FIG. 3, a preferred embodiment of the invention comprises a dial indicator, indicated generally by the reference numeral 10, having a movable pointer 11 adapted to indicate by how many $g$'s and whether an aircraft is being operated over or under a computed allowable load limit. For example, if the pointer 11 moves in a clockwise direction to indicia 5 it means that the aircraft is being operated within five $g$'s of the computed allowable load limit. If the pointer 11 of the indicator 10 moves in a counterclockwise direction from zero to indicia 5, on the left, FIG. 3 it means that the computed allowable load limit is being exceeded by five $g$'s. Usually, the latter is never allowed to occur by a pilot of the aircraft since the aircraft will be operated in such a manner that the pointer 11 will never be caused to move the left of zero. For this reason the left hand indicia can be eliminated and a warning light and/or audible signal can be energized in a known manner.

Preferably, the dial indicator 10 is a phase sensitive voltmeter. However, it will be understood that other types of indicators may be used or that the invention can be incorporated into the control system of an aircraft in a known manner.

The signal supplied to the indicator 10 via a line 12 is obtained from a comparator unit 14 comprising a transformer having two grounded primary windings 15, 16 and a grounded secondary winding 17. The winding 17 is connected to the indicator 10 via the line 12. The windings 15 and 16 are respectively adapted to be energized with electrical signals of opposite phase proportional to the computed allowable load and the actual instantaneous normal acceleration load.

More particularly the instantaneous load signal is supplied to the winding 16 by a normal accelerometer unit 18 comprising a mass M resiliently suspended from a portion of the aircraft's airframe 19 by means of a coiled tension spring 20. As the mass M moves up and down, depending upon whether the aircraft is respectively undergoing negative or positive normal acceleration respectively, a wiper 21 of a centertapped potentiometer 22 is moved a proportional amount in the same direction. The potentiometer 22, being energized from a standard electrical supply, permits the wiper 21 to pick off a signal of a phase opposite to the phase of the signal supplied to winding 15. The wiper 21 will pick off a signal proportional to the number of $g$'s of normal acceleration without regard to whether the acceleration is positive or negative. The reason for this will be made more apparent hereinafter.

The winding 15 is supplied with a signal opposite in phase, as pointed out, to the signal in the winding 16 by the allowable load limit computer, FIG. 3, via conductor 25.

As a rule, the signal in the winding 15 is larger than the signal in winding 16, and accordingly, the difference of the two signals 15, 16 is picked off by the secondary or summing winding 17. The signal in the secondary winding 17, therefore, has the same phase as the dominant signal in the winding 15. Accordingly, the pointer 11 of the indicator 10 moves in a clockwise direction to indicate the number of additional $g$'s that the aircraft can undergo without the computed load limit being reached or exceeded. The pilot should never permit the pointer 11 to move to the left of zero lest a structural failure of the airframe occur.

Alternatively, if the signal in the winding 16 is larger than the signal in the winding 15, the pilot is immediately informed of the critical situation as the pointer 11 will move to the left of zero in the indicator 10.

More particularly, the allowable load limit computer is an electromechanical arrangement comprising a Mach member sensor 26, an indicated air speed sensor 27, a K factor multiplier unit 28, and a 0.25 $g$ safety factor negative bias unit 30 connected and arranged in such a manner as to compute the allowable load limit for a particular aircraft and transmit an electrical signal proportional to the maximum load, including a 0.25 $g$ safety factor, to the winding 15 of the comparator unit 14, which signal is in accordance with the V-$n$ envelope of FIG. 1.

Since the allowable load limit varies with each individual type of aircraft, it is necessary that the invention be especially adapted accordingly. A particular aircraft has been selected having relatively simple performance characteristics so as to not complicate the description of the invention. It is understood that the characteristics of a particular aircraft is set forth herein merely for the purpose of ilustrating and describing the best mode of carrying out the invention and is not to be construed as limiting the invention.

FIG. 1 is a flight strength diagram, commonly referred to as a V-$n$ diagram, for a T2V-1 U.S. Navy aircraft. The diagram has been obtained empirically and shows the load factor in $g$'s imposed on the aircraft at speeds up to 505 knots and at altitudes up to 45,000 feet above sea level. The aircraft has maximum allowable load limits of 7.33 $g$ and $-3.0$ $g$. The object lines in FIG. 1 illustrates the maximum allowable load limits without a safety factor of 0.25 $g$ imposed. The critical positive and negative load limits are assumed to be identical for purposes of simplicity in the instant invention, although this is not exactly the case.

Figure 2:
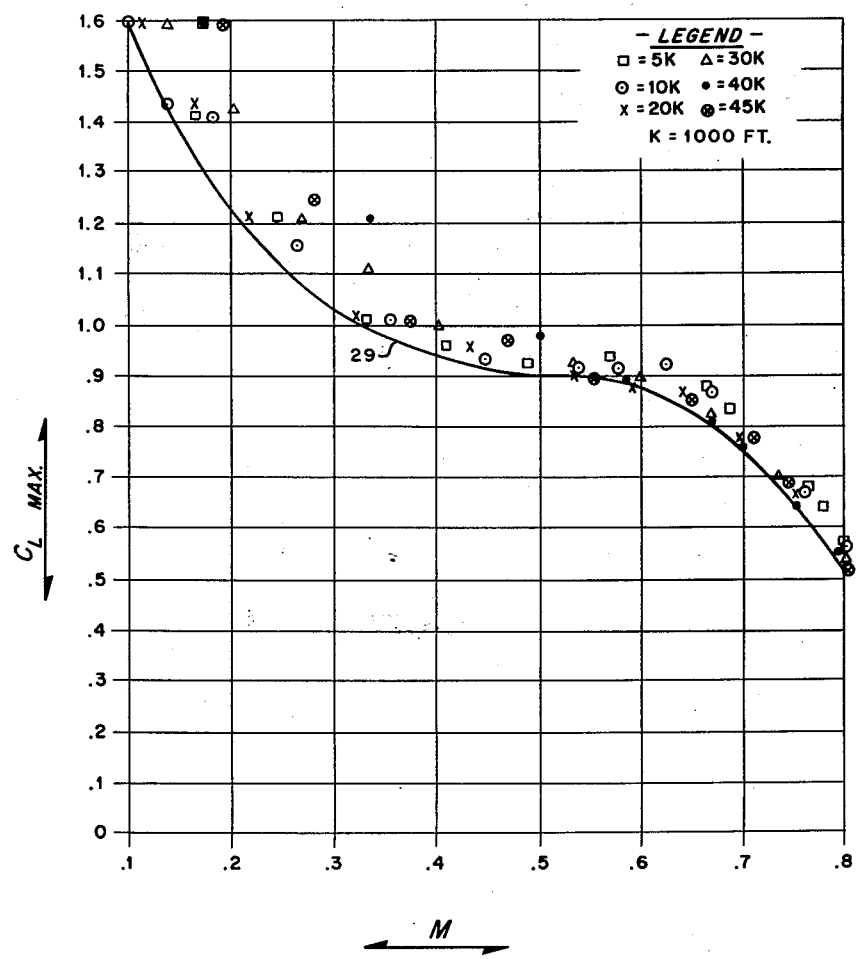
FIG. 2 is a diagram of the aircraft's maximum lift coefficient versus the Mach number for use in designing the peripheral curve of a suitable Mach cam.

FIG. 2 illustrates the maximum allowable lift co-efficient $C_L$max at speeds up to Mach 0.8 at altitudes up to 45,000 feet. A line, indicated generally by the reference numeral 29 is drawn so as to illustrate the maximum permissible or safe operational lift coefficient $C_L$max at all altitudes and is used to design the curve of a $C_L$max cam 33 in FIG. 3, which will be more fully described hereinafter.

It is apparent from the complexity of FIGS. 1 and 2 that the pilot of the aircraft will be relieved of a considerable mental burden by the provision of a computer that can calculate the maximum allowable load limit or normal acceleration with a safety factor included, at the various aircraft speeds and altitudes.

The situation is further complicated because the curves in FIGS. 1 and 2 will usually be more intricate for transonic and supersonic aircraft.

The governing equations for the subject computer which makes available the allowable load limit from the V-$n$ envelope, FIG. 1, of the aircraft for any combination of air speed and altitude are presented below.

By definition (1) $\quad\quad\quad N=L/W$ where $N=$normal acceleration, $g$'s
$L=$lift in pounds
$W=$aircraft's gross weight in pounds as is known (2) $\quad\quad\quad L=C_L.S.q$
(3) $\quad\quad\quad L=C_L S(\frac{1}{2})P_o V^2$ where $C_L=$lift coefficient
$S=$wing area in sq. ft.
$q=$dynamic air pressure in lbs./ft.$^2$
$P_o=$air density at sea level, slugs/ft.$^3$
$V=$indicated air speed, ft./sec.

Combining Equations 1 and 3

(4) $\quad\quad\quad N=C_L S P_o V^2/2W$

If the maximum values for S, W and $P_o$ are considered constant, it is apparent that Equation 4 can be solved if instantaneous values are obtainable for the two variables $C_L$ and $V^2$. Accordingly, the following equation can be written (5) $\quad\quad\quad N=K.C_L\text{max}.V^2$ where (6) $\quad\quad\quad K=SP_o/2W$ Although the air foil lift area S remains substantially constant, ignoring the effect of flaps and other equipment such as wing tanks and the like, the air density $P_o$ and the weight of the aircraft will vary. The maximum air density is, therefore, assumed. At the higher altitudes, the lesser air density will operate as an additional safety factor incorporated into the computed allowable load limit. Furthermore, as fuel, ammunition, and the other expendables in the aircraft are used, the weight of the aircraft is reduced. A reduction in weight permits the aircraft to be operated with a greater normal acceleration imposed thereon. By assuming the maximum or gross weight of the aircraft to be constant, a further safety factor is obtained so that should a pilot operate the aircraft in such a manner as to exceed the computed allowable load limit there is still a chance that the aircraft will not be overstressed.

In operation, the absolute value of a normal accelerometer or monitor 18 is compared to the absolute value of the computed maximum allowable load limit from the flight strength diagram of FIG. 1. The output of the unit 28 is negatively biased by an electrical voltage proportional to 0.25 $g$ to provide a margin of safety against overshoot or inaccuracies in either the computer or the normal accelerometer 18. The command to the aircraft would then be limited on the basis of the comparison in unit 14.

This means that (7) $\quad\quad\quad /N_c/-/N_a/=0.25\ g$

The commands to the aircraft are then reduced when (8) $\quad\quad\quad /N_a/=/N_c/-0.25\ g$ where $/N_a/$ is the absolute value of the normal aceleration of the aircraft, and $/N_c/$ is the absolute value of the computed flight strength diagram limiting N.

The computation is preferably accomplished by feeding the signal from the conventional Mach number sensor 26 to an amplifier 31, which drives a Selsyn type motor 32. The motor 32 angularly positions the $C_L$max cam 33, constructed in accordance with the curve 29 in FIG. 2, by means of a mechanical shaft arrangement 34.

The shaft arrangement 34 is adopted to position a wiper 35 of a potentiometer 36, which is energized from a standard electrical source, and causes a nulling signal to be picked off and fed back to the input side of the amplifier 31. The nulling of the output of the amplifier 31 stops the motor 32 and the cam 33 remains positioned according to the magnitude of the instantaneous Mach number at which the aircraft is traveling.

A roller 37 is mounted on a shaft means 38 as a follower of the $C_L$max cam 33. Accordingly, the roller 37 is adapted to position a wiper 40 on a potentiometer 41, energized from a standard electrical power supply, for the purpose of energizing a grounded multiplying potentiometer 42 with a signal proportional to the instantaneous value of $C_L$max of Equation 5.

The voltage applied in potentiometer 41 may be in phase opposition to the voltage applied to potentiometer 22. Alternatively, windings 15, 16 in comparator 14 may be wound in flux opposing relationship to each other.

A wiper 43 of the multiplier 42 is positioned according to the instantaneous value of $V^2$ in Equation 5 and feeds a signal proportional to a product of $V^2 C_L$max to the K factor multiplier unit 28.

The positioning of the wiper 43 is effected by the positioning of a cam follower roller 44 on a $V^2$ cam 45. The motion of the roller 44 is transmitted via a mechanical shaft arrangement 46 to the wiper 43. The $V^2$ cam 45 is angularly positioned via a mechanical shaft arrangement 47 connected to the drive shaft of a motor 48. A signal from the output of an amplifier 50 drives the motor 48.

The output signal of the amplifier 50 is nulled when the input signal thereto from the air speed sensor 27 and a potentiometer 51 are equal to proportion and opposite in phase. A wiper 52 rectilinearly positioned by the mechanical shaft arrangement 47 simultaneously with the angular positioning of the $V^2$ cam 45, picks off a nulling signal from the potentiometer 51 and feeds the signal back to the input side of the amplifier 50. The potentiometer 51 is supplied with electrical power from a standard electrical power source.

The K factor unit 24 multiplies the signal picked off by the wiper 43 by an amount proportional to the equivalent value of $SP_0/2W$ in Equation 6. It is understood that any changes in weight W, air density $P_0$ and/or wing area S may be compensated for by a manual or automatic computation and adjustment of the K factor multiplier unit 28 in a known manner.

The output signal from unit 28 to the negative 0.25 g bias unit 14 via line 25 is proportional to the computed critical load limit of the aircraft. The negative bias unit subtracts a voltage proportional to 0.25 g in a conventional manner.

From the foregoing, it is apparent how the invention can be adapted for use in various aircraft and how the invention can be made more sophisticated by the introduction of additional variables.

It is the intention to hereby cover not only the above-mentioned modifications of the preferred construction shown, but all adaptations, modifications, and uses thereof which come within the practice of those skilled in the art to which the invention relates, and the scope of the appended claims.

What is claimed is:

1. In an instrument for an aircraft, acceleration means for sensing and providing a first signal proportional to the actual instantaneous normal acceleration of the aircraft, means for computing and providing a second signal opposite in phase to said first signal and proportional to the maximum allowable load limit of the aircraft as a function of the current Mach number and indicated air speed of the aircraft, means for summing said first and second signals and providing a third signal proportional to the instantaneous differences in magnitude of said first and second signals and having a phase consistent with the phase of the one of said first and second signals having the greater magnitude, and indicator means for indicating the phase and magnitude of said third signal.

2. In an instrument for an aircraft, phase sensitive voltmeter means having a pointer and a fixed dial face having indicia marks thereon graduated on either side of a zero datum for showing increments of normal acceleration of the aircraft, means for computing and providing a first signal proportional to the maximum allowable normal acceleration permissible for the current Mach number and indicated air speed of the aircraft, accelerometer means for sensing and providing a second signal proportional to the actual instantaneous normal acceleration of the aircraft and of a phase opposite to the phase of said first signal, means for summing said first and second signals and providing a third signal proportional to the instantaneous differences in magnitude of said first and second signals and having a phase consistent with the phase of the one of said first and second signals having the greater magnitude, means connecting said summing means with said voltmeter means and transmitting said third signal thereto.

3. A computer for an aircraft comprising, means for generating a first signal proportional to the instantaneous Mach number at which the aircraft is traveling, means for converting said first signal into a second signal proportional to the maximum allowable lift coefficient of the aircraft at said Mach number, means for generating a third signal proportional to the instantaneous indicated airspeed at which the aircraft is traveling, means for providing a fourth signal proportional to the square of said third signal, means multiplying said second and third signals and thereby providing a fifth signal approximately proportional to an absolute value of the maximum allowable load for the aircraft.

4. A computer comprising, means for generating a first signal proportional to the instantaneous Mach number at which the aircraft is traveling, means for converting said first signal into a second signal proportional to the maximum allowable lift coefficient of the aircraft at said Mach number, means for generating a third signal proportional to the instantaneous indicated airspeed at which the aircraft is traveling, means for providing a fourth signal proportional to the square of said third signal, means multiplying said second and third signals and thereby providing a fifth signal approximately proportional to an absolute value of the maximum allowable load for the aircraft, and multiplier means for multiplying said fifth signal by a quantity proportional to a product of the total wing area and the air density at sea level divided by two times the gross weight of the aircraft and thereby providing a sixth signal having an absolute value directly proportional to the maximum allowable load of the aircraft at said instantaneous Mach number and indicated airspeed.

5. A computer as set forth in claim 4, further comprising negative bias means for subtracting from said sixth signal a quantity proportional to a predetermined factor of safety.

6. A computer for an airplane, comprising first means for generating a first signal proportional to the maximum allowable lift coefficient for the aircraft at the Mach number at which the aircraft is traveling, second means for generating a second signal proportional to the square of the indicated airspeed of the aircraft, multiplier means including a grounded potentiometer and a wiper, said potentiometer being energized at a magnitude proportional to the magnitude of said first signal, and means for positioning said wiper on said potentiometer according to the magnitude of said second signal and causing said wiper to pick off a third signal proportional to the product of said first and second signals.

7. A computer as set forth in claim 6, further comprising means for multiplying said third signal by a constant and providing a fourth signal having an absolute value equivalent to the maximum allowable load permissible for the aircraft at the Mach number and indicated airspeed.

8. A computer as set forth in claim 7, further comprising, comparator means, means for supplying a fifth signal to said comparator means having an absolute value equivalent to the instantaneous normal acceleration of the aircraft, said comparator means comparing said fourth and fifth signals and providing a sixth signal proportional to the difference therebetween.

References Cited in the file of this patent

UNITED STATES PATENTS

| | | |
|---|---|---|
| 2,182,706 | Shanley | Dec. 5, 1939 |
| 2,538,303 | Findley | Jan. 16, 1951 |
| 2,682,768 | White | July 6, 1954 |

FOREIGN PATENTS

| | | |
|---|---|---|
| 156,477 | Australia | May 14, 1954 |
| 748,689 | Great Britain | May 9, 1956 |